March 22, 1932. C. E. FYFE 1,850,667
PROTECTIVE MEANS
Filed July 11, 1929   12 Sheets-Sheet 1

Fig.1.

Inventor
CHARLES E. FYFE
By his Attorney

March 22, 1932.          C. E. FYFE.          1,850,667
PROTECTIVE MEANS
Filed July 11, 1929       12 Sheets-Sheet 6

Inventor
CHARLES E. FYFE
By his Attorney

March 22, 1932.   C. E. FYFE   1,850,667
PROTECTIVE MEANS
Filed July 11, 1929   12 Sheets-Sheet 11

Inventor
CHARLES E. FYFE
By his Attorney

March 22, 1932.  C. E. FYFE  1,850,667
PROTECTIVE MEANS
Filed July 11, 1929   12 Sheets-Sheet 12

Inventor
CHARLES E. FYFE
By his Attorney

Patented Mar. 22, 1932

1,850,667

UNITED STATES PATENT OFFICE

CHARLES E. FYFE, OF CEDARHURST, NEW YORK

PROTECTIVE MEANS

Application filed July 11, 1929. Serial No. 377,405.

This invention relates generally to protective means to be used in connection with banks or other institutions likely to be a place of attempted hold-up, and the main object of the invention is to provide means that can readily be brought into action to protect an attendant or clerk who may be subjected to hold-up.

In the accompanying drawings the invention is disclosed in a concrete and preferred form in which.

One of the features of the invention resides in an assemblage of collapsible shields (Figs. 1 to 13 inclusive) normally folded into a recumbent position and preferably forming a continuation of a counter, desk or other supporting surface that constitutes the station of an attendant, such as a teller's station in a bank. Associated with this assemblage are means to urge the shields into protective position and a releasable latch to normally retain said assemblage in folded position and which when released admits of said shields moving into protective position.

The number and character of the shields constituting the assemblage may, of course, vary widely and will depend upon the kind of protection desired. So likewise the different latching and releasing means employed may be constructed in many different ways. The means that urge the shields into protective position may be any motor means known in the art, but preferably quick-acting weights or springs are utilized.

Figure 1:
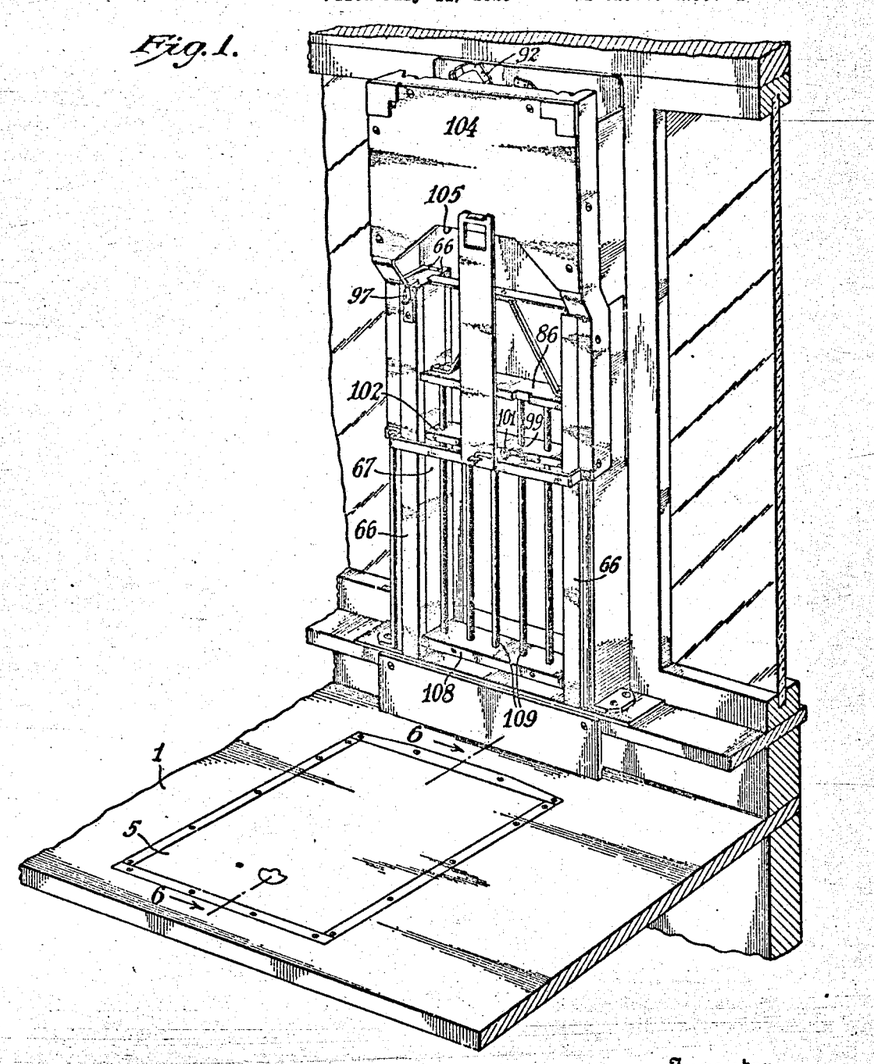
Fig. 1 is a perspective view with parts removed of the protective equipment applied to the counting table in a bank, the parts being in their folded position and nested within the table, together with a teller's window or gate of special construction associated therewith.
Figures 6, 7, 8, 9, 10, 11:
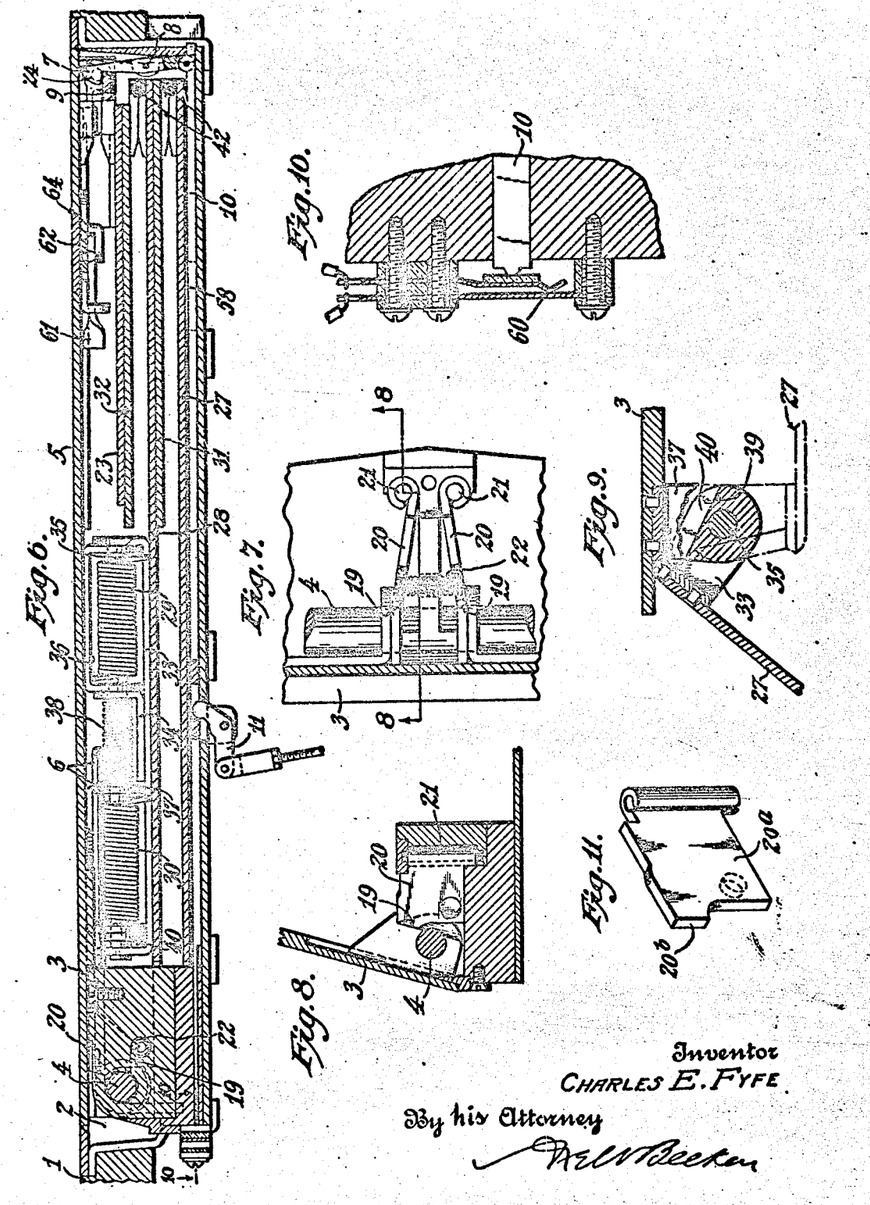
Fig. 6 is a sectional view of the assemblage in folded position substantially on the plane of line 6—6 of Fig. 1.
Fig. 7 is an enlarged plan view of the butterfly latch partly in section.
Fig. 8 is a vertical sectional view substantially on the plane of line 8—8 of Fig. 7.
Fig. 9 is a detail sectional view substantially on the plane of line 9—9 of Fig. 4 with parts broken away and showing the hinge of one of the side wings.
Fig. 10 is a detail sectional view substantially on the plane of line 10—10 of Fig. 6.
Fig. 11 is a perspective view of a modified form of butterfly catch.
Figure 12:
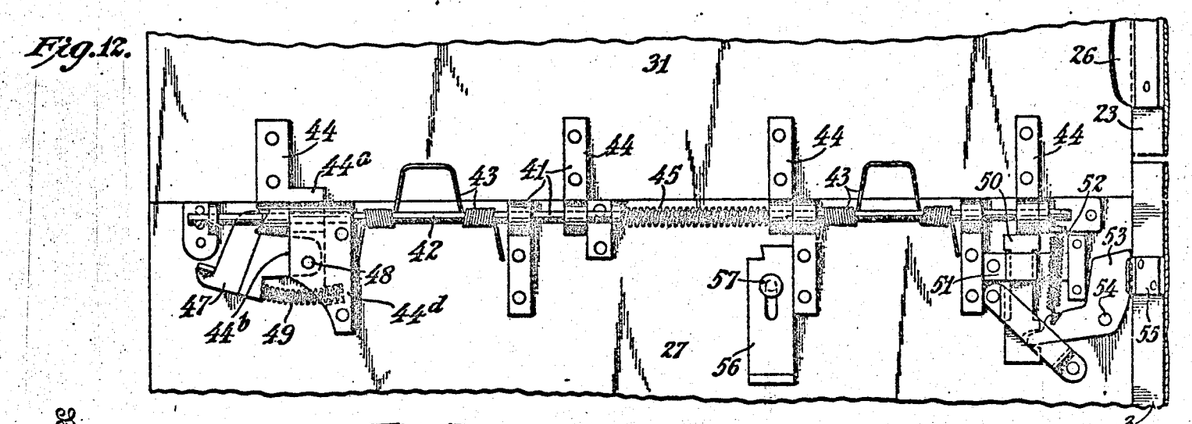
Fig. 12 is an enlarged detail view of the upper end of the left hand side shield and lower end of the side top shield shown in Fig. 4, showing both shields fully open, with parts broken away and in section.

In the present instance, 1 indicates a counter having a recessed portion or a depression 2 to receive the folded assemblage when the latter is in its collapsed position. As here shown, the assemblage consists of the following members: 3 indicates a main shield pivotally mounted by means of pivot 4 in the counter and as shown in Figs. 1 and 6, when this shield is in its recumbent position it presents a top surface 5 that forms a part of the counter. The means that tend to urge said main shield into an upright protective position are springs 6, and the retaining or latching means are represented by dog 7 pivotally supported at 8 in the recess, which dog 7 engages member 9 of the shield. A latch rod 10, slidable in the recess, controls the dog and may be actuated to release dog 7 from member 9 by any suitable means as by bell crank 11. Springs 12 anchored on brackets 13 in the recess and connected to hooks 14 of the latch rod tend to urge dog 7 into the position shown in Fig. 6, that is, into retaining or latching position. When latch rod 10 has been moved into position to release dog 7 from member 9, that is, in opposition to the action of springs 12, locking dogs 15, pivotally supported at 16 in the recess and urged inwardly, by means of springs 18, toward abutment surfaces 17 in rod 10, come into action and retains release dog 7 in its unlocked position. Locking dogs 15 are released manually when it is desired to restore dog 7 to locking position, the return movement of rod 10 being effected by springs 12. Suitable means are provided to lock the main shield in the upright protective position. As shown best in Figs. 7 and 8, the main shield carries two abutment surfaces 19 which are engaged by butterfly latching members 20 when said shield reaches the upright position. Members 20 are pivoted at 21 and are urged into their expanded position by spring 22. This locking device has to be released manually by pressing members 20 toward each other so as to disengage them from abutment surfaces 19, after which the main shield may be lowered. As shown best in Fig. 2, the upright protective position of the main shield is not necessarily a perpendicular one, but is preferably an inclined one so that bullets will be more readily deflected. In the construction shown in Figs. 2, 7 and 8, the engaging surface of member 20 that engages the abutment surface indicated by 19, is inclined; but should the counter in which the device is arranged, have an inclined top surface then the main shield could occupy an upright position perpendicular to said inclined top surface, in which event the construction shown in Fig. 11 could be used. As there shown, member 20$^a$ is provided with a vertical engaging surface 20$^b$.

23 indicates a main top wing that may be used in connection with the main shield. In the present instance, it is pivotally connected to said main shield as clearly indicated in Fig. 4 at 24, and springs 25 tend to urge the top wing into its extended position. 26 are locking abutments, the function of which will appear later.

Figure 2:
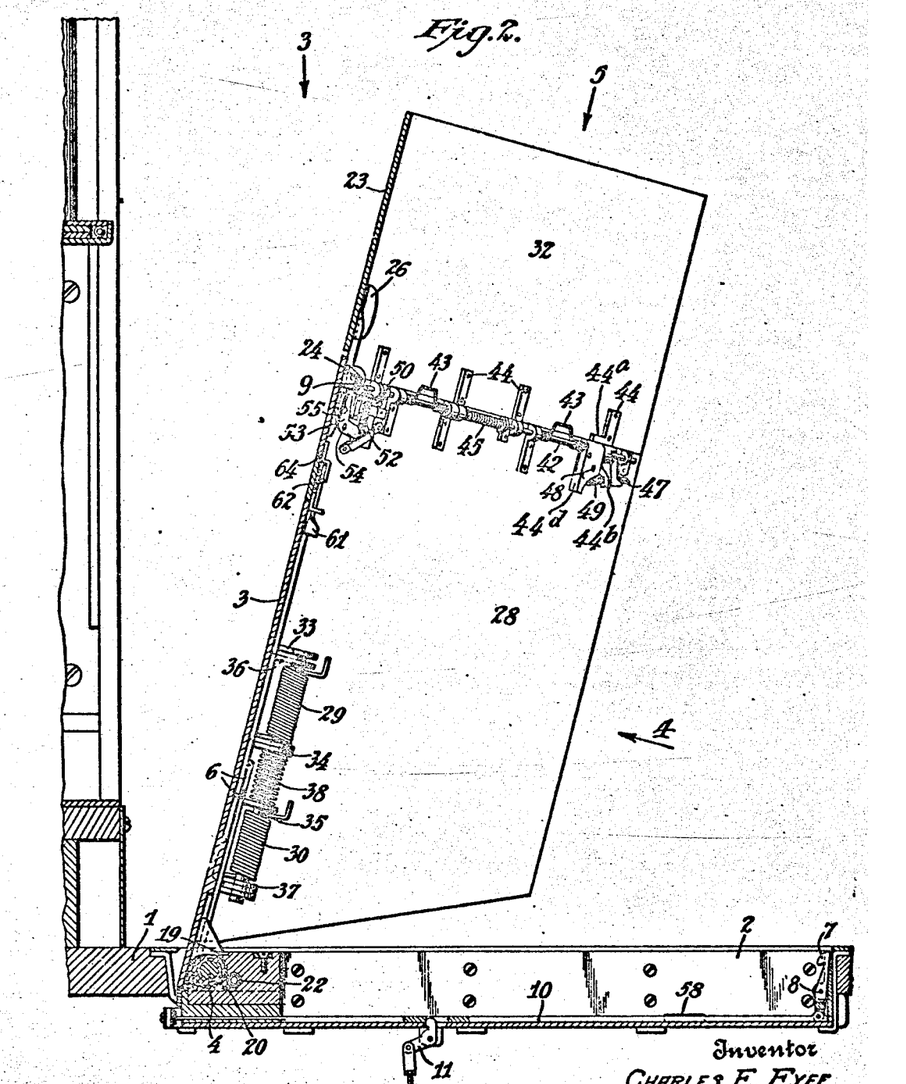
Fig. 2 is a central vertical sectional view of the collapsible shield assemblage, with the shields in protective or unfolded position, said view being a section substantially on the plane of line 2—2 of Fig. 3.
Figure 3:
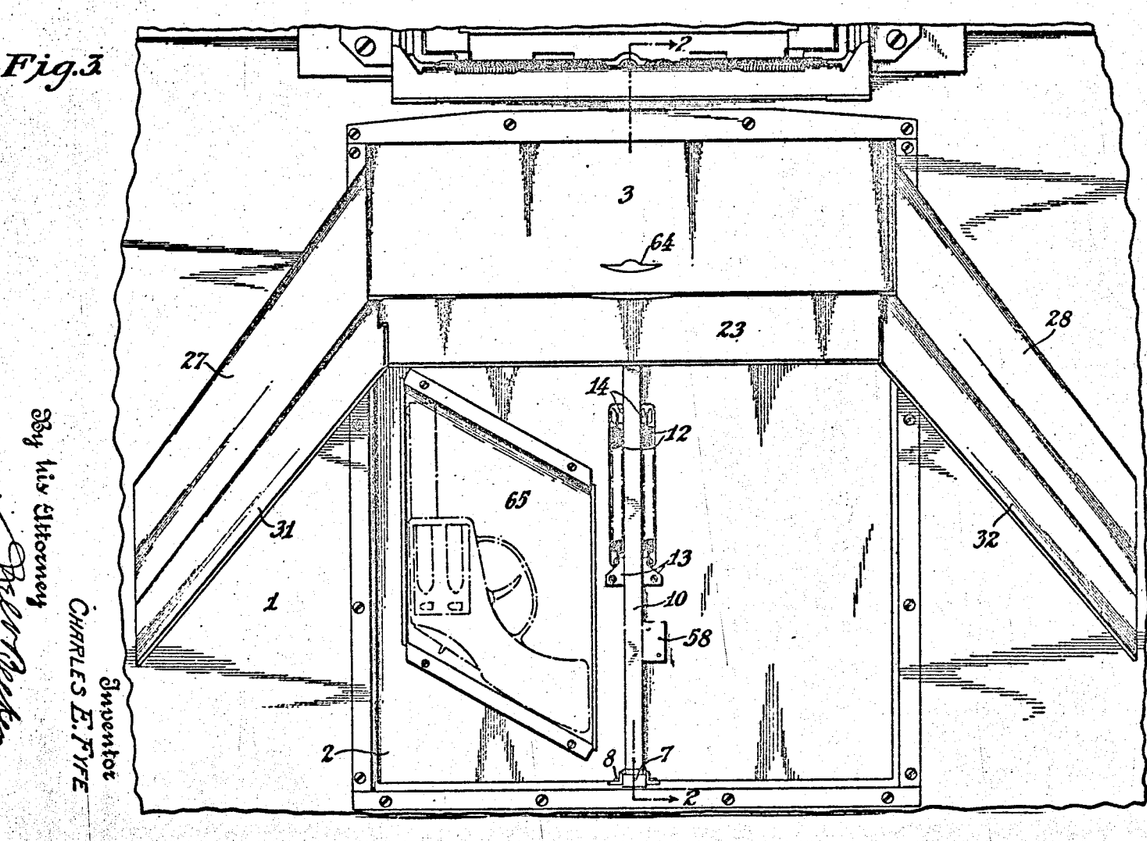
Fig. 3 is a plan view looking in the direction of arrow 3 of Fig. 2.
Figure 4:
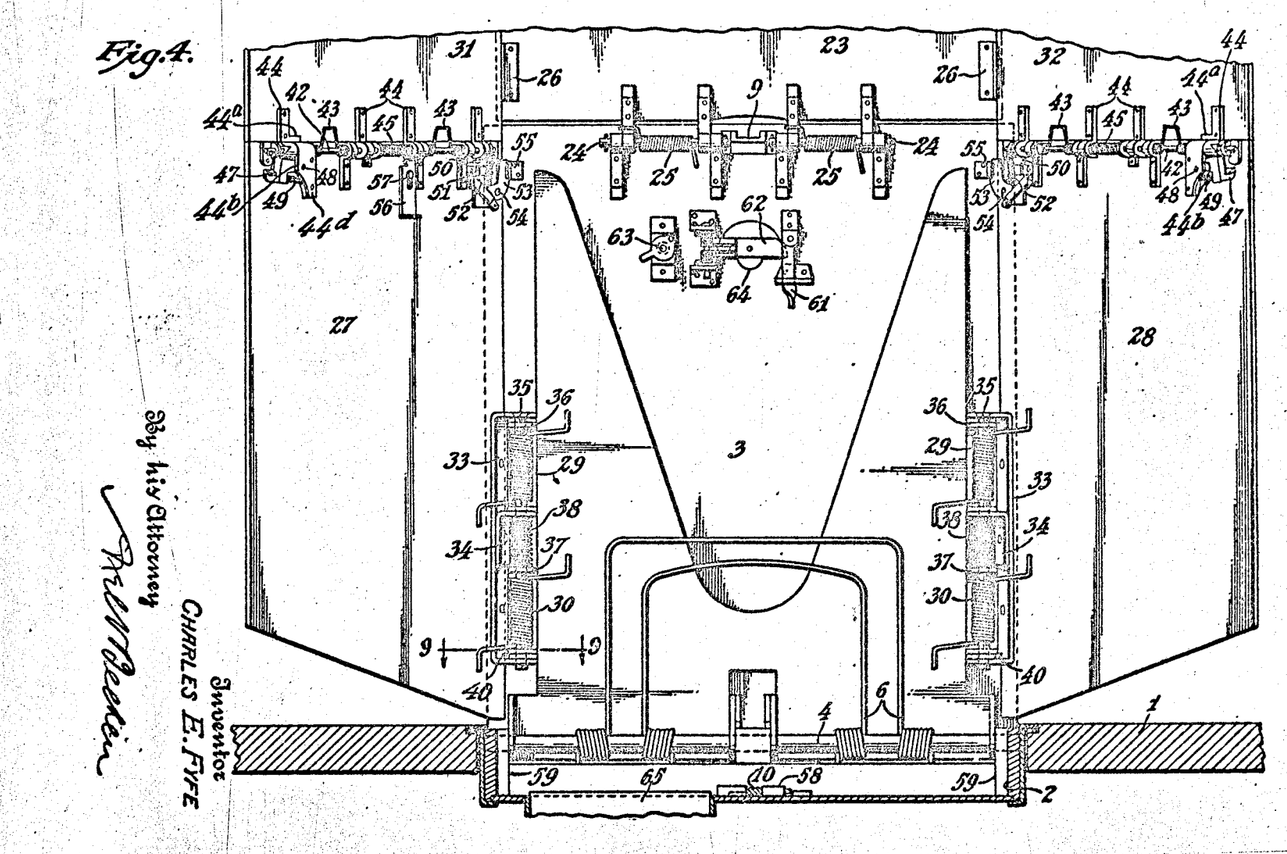
Fig. 4 is a view in elevation looking in the direction of arrow 4 of Fig. 2, and with parts in section.
Figure 5:
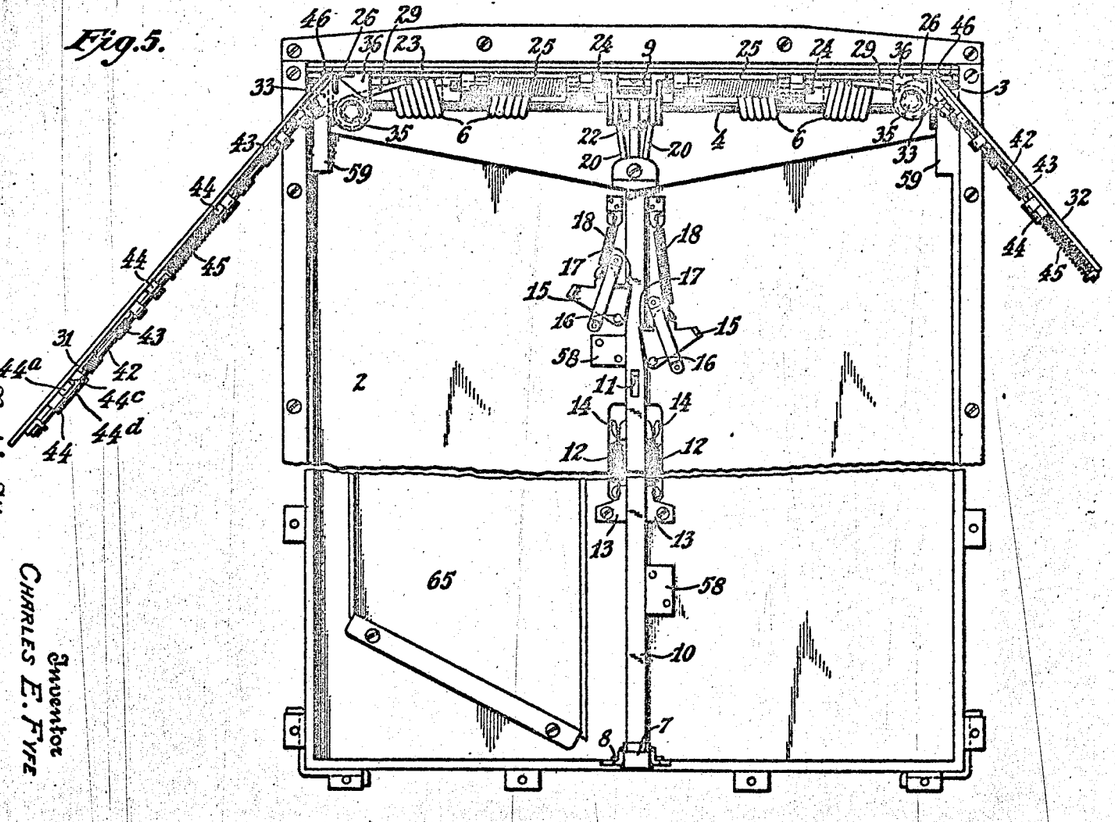
Fig. 5 is a plan view looking in the direction of arrow 5 of Fig. 2, with parts broken away.
Figure 13:
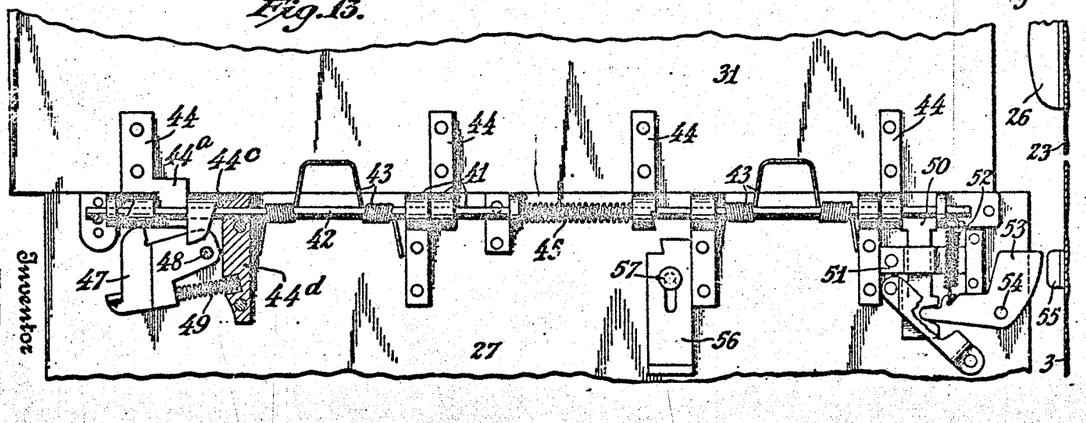
Fig. 13 is a view similar to Fig. 12 but with the side top shield disengaged from the main shields.

27 and 28 indicate two side wings that are pivotally connected to the main shield as shown clearly in Fig. 4 and which are urged into the extended protective position by means of springs 29 and 30. These side wings may be provided with side top wings 31 and 32, and when this arrangement of shields is employed, there will preferably also be employed an interlocking construction whereby when the different shield elements are extended, they will be rigidly interlocked. Inasmuch as the construction at both sides of the device is substantially the same, it will be only necessary to describe one side thereof. The hinge construction between the main shield and a side wing, such as 27, is also a vertically slidable one and is here shown as follows: Carried by wing 27 is a main bracket member 33 (Figs. 2, 4 and 9) which is a piece of sheet metal bent at its upper end above spring 29 and at its lower end below spring 30. Carried by main bracket member 33 is an abutment member 34 and a pintle 35. Carried by the main shield are two auxiliary brackets 36 and 37. Springs 29 and 30 previously referred to and which serve to urge the side wing into open position, surround pintle 35, and spring 29 is confined between the ends of bracket 36 while spring 30 is confined between the ends of bracket 37. 38 is the center spring, the function of which is to slightly elevate wing 27 and as seen in Figs. 2 and 4 this spring is interposed between the upper end of lower auxiliary bracket 37 and abutment 34. Carried by the lower end of bracket 37 is a latch surface 39 and on the main bracket (33) is a corresponding latch 40. When the side wing is in its folded position (dotted lines Fig. 9) latch 40 is beneath the member provided with surface 39, and when said side wing is swung open, said latch will swing beneath said member until the parts reach the position shown in full lines in Fig. 9 when said side wing rises under compulsion of spring 38 and latch 40 moves upwardly into engagement with surface 39. When the parts are in this position the side wing cannot be folded unless said side wing is first depressed against the tension of spring 38 to bring 39 and 40 out of engagement with each other. The above-described rising movement of side wing 27, under compulsion of spring 38, is also utilized in a manner that will presently appear to release and admit of the extension of top side wing 31. The hinge connection between side wing 27 and top side wing 31 is shown quite clearly in Figs. 12 and 13 and may be designated generally by reference character 41. This hinge construction also admits of a sliding movement of top side wing 31 with respect to side wing 27, but this sliding movement is a lateral or horizontal one toward and away from the main shield and has for its object the locking of said top side wing 31 and of main top wing 23 in their extended position. Pintle 42 is mounted in brackets on the side wing and springs 43 tend to urge the top side wing into extended position. Brackets 44 on the top side wing are slidable on pintle 42 and a spring 45 tends to urge top side wing into the position best shown in Fig. 12 and also in Fig. 5 where said top side wing enters between a portion 46 of the main top wing and locking abutment 26. When the parts are in this position, locking latch 47 pivoted at 48 and actuated by spring 49 will prevent sidewise retraction into the position shown in Fig. 13, and it will likewise be understood that said top side wing cannot be folded on account of locking abutment 26. Nor can main top wing 23 be folded on account of the position of side top wing 31. Hinge member 44 carries a locking member 44ª which, when top side wing 31 has been brought into the position Fig. 13, will, upon the folding of said top side wing 31, engage surface 44ᵇ. So long as member 44ª is in engagement with surface 44ᵇ the top side wing cannot move sidewise toward the main shields, and it will therefore be seen that it is not until top side wing 31 has been completely unfolded from side wing 27 and 44ª registers with slot 44ᶜ (Fig. 5) in bracket 44ᵈ of wing 27 that said top wing 31 can move sidewise toward the main shields. To admit of folding the top side wing, it is necessary first to release latch 47 after which it is moved sidewise (Fig. 13) to free it from 26. To hold the parts in this position, a latch 50 slidable in strap 51 and actuated by spring 52 acting through cam lever 53 pivoted at 54 is provided. It will be noted, however, that latch 50 is not free to operate so long as lever 53 is engaging cam 55 on the main shield (Fig. 12) but that side wing 27 must be swung on its pivotal connection with the main shield into a position such as shown in Fig. 13, in which position spring 52 is free to throw in latch 50, provided top side wing 31 has been moved a sufficient distance to the left. To relieve the operator of the necessity of holding 31 against the compulsion of spring 45, a temporary latch 56 slidable on pin 57 may be used. Preferably this temporary latch falls by gravity when latch 50 moves into the position shown in Fig. 13 inasmuch as a slight additional sidewise movement of 31 is required to admit of 50 moving into locking position. It will further be understood from the foregoing that when the reverse operation takes place, that is, when side wing 27 is unfolding, latch 50 will remain in the position shown in Fig. 13 until said side wing and top side wing 31 are completely unfolded thereby bringing cam lever 53 adjacent to cam 55 and 31 past 26 when, under compulsion of spring 38, the side wing (27) rises thereby causing cam 55 to actuate cam lever 53 so as to retract latch 50 and allow top side wing 31 to move sidewise into the position shown in Fig. 12.

To collapse the device, top side wing 31 is first moved to the left away from main top wing 23 and is temporarily held in that position by latch 56. Side top wing 32 is now released sidewise and folded over 28, the operator holding the parts in this position. Main top wing 23 is now free and is folded against main shield 3. Side wing 28 is now depressed to disengage 39 and 40 (Fig. 9) and to admit of said wing 28 being folded against the main shields. Side top wing 31 is now moved slightly further to the left thereby allowing latch 50 to move into the position shown in Fig. 13, latch 56 falling by gravity, after which top side wing 31 is folded over side wing 27 and the latter is depressed to disengage 39 and 40 to allow said wing 27 to be folded against side wing 28. Latch dogs 15 controlling latch rod 10 are now released from engagement therewith thereby restoring main latch 7 to its original position, and finally butterfly latch members 20 are released from engagement with 19 thereby permitting the operator to lower the assemblage to the position shown in Figs. 1 and 6 so as to permit latch 7 to engage member 9 and hold the assemblage locked. It should be noted that supports 58 are arranged in the bottom of recess 2 so that the assemblage will not rest on latch rod 10 and prevent its free movement.

The action that occurs when latch 7 is released and the shield assemblage moves into protective position will be apparent from the construction of the parts and sequence of steps previously described and it remains only to be pointed out that as the main shield rises the complete unfolding action of side wings 27 and 28 is delayed by reason of ledges 59 so as to give main top wing 23 an opportunity to advance into final open position before said side wings open completely.

Many additional safety and alarm features may, of course, be added. For instance, (Fig. 10), latch rod 10 may by its releasing movement close a circuit at 60 to sound an alarm, and (Fig. 4) the attendant by releasing latch 61 will free a swinging lever 62 that moves over and fires a blank cartridge by engagement at 63. Member 62 by its movement exposes a small opening 64 sufficient to enable the attendant to point a gun which may be kept in compartment 65 (Figs. 3 and 5) below the assemblage.

It will be seen from the foregoing description of the protective assemblage, that the shielding afforded the attendant is of much greater amplitude than the dimensions of a single leaf raised from a blank counter would be. Also, it will be appreciated by inspecting Fig. 1, that the assemblage is so small, when collapsed, that boxes or containers for coins, etc. may be placed within ready reach of the attendant without resting upon the assemblage itself. Furthermore, the assemblage when in protective position presents not merely a front shield but as shown best in Figs. 3 and 5, angularly disposed side shields that tend to enclose the attendant and to protect him from three sides.

Figure 14:
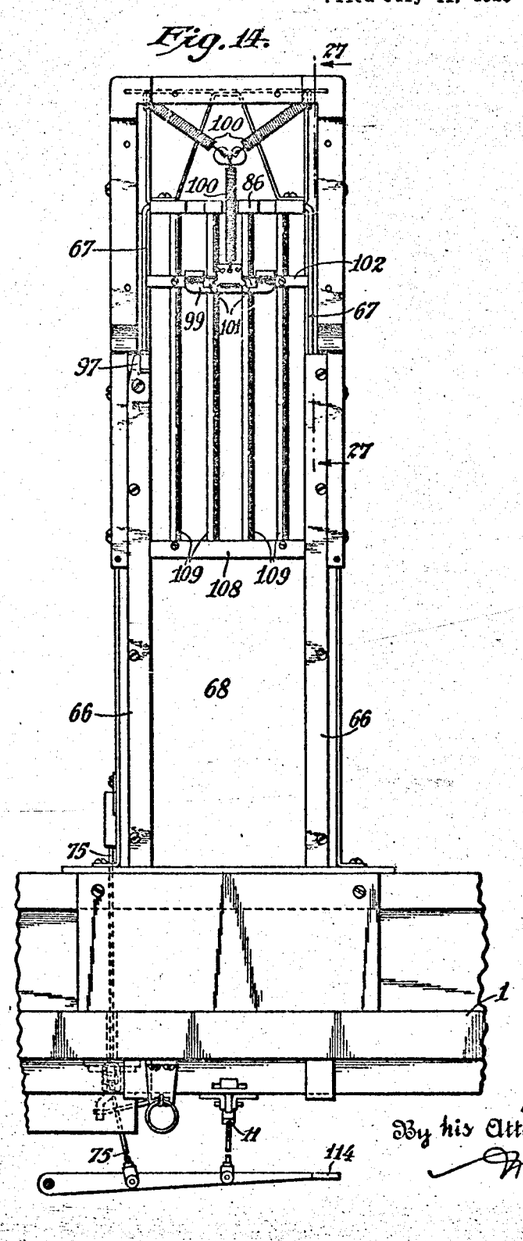
Fig. 14 is a view in elevation of the teller's gate from behind the counter or table in Fig. 1, with some of the parts removed and with the gate in its upper position.
Figure 15:
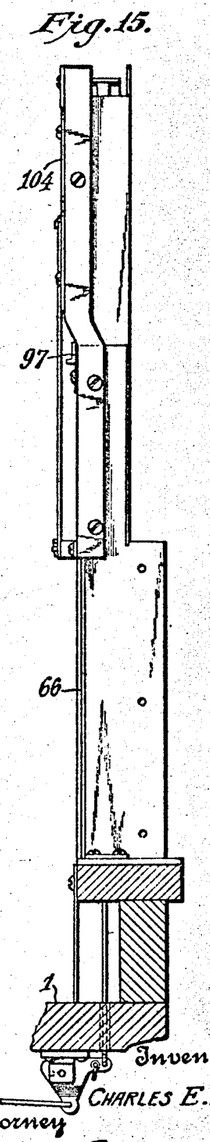
Fig. 15 is a view in side elevation of Fig. 14 with parts in section.
Figure 16:
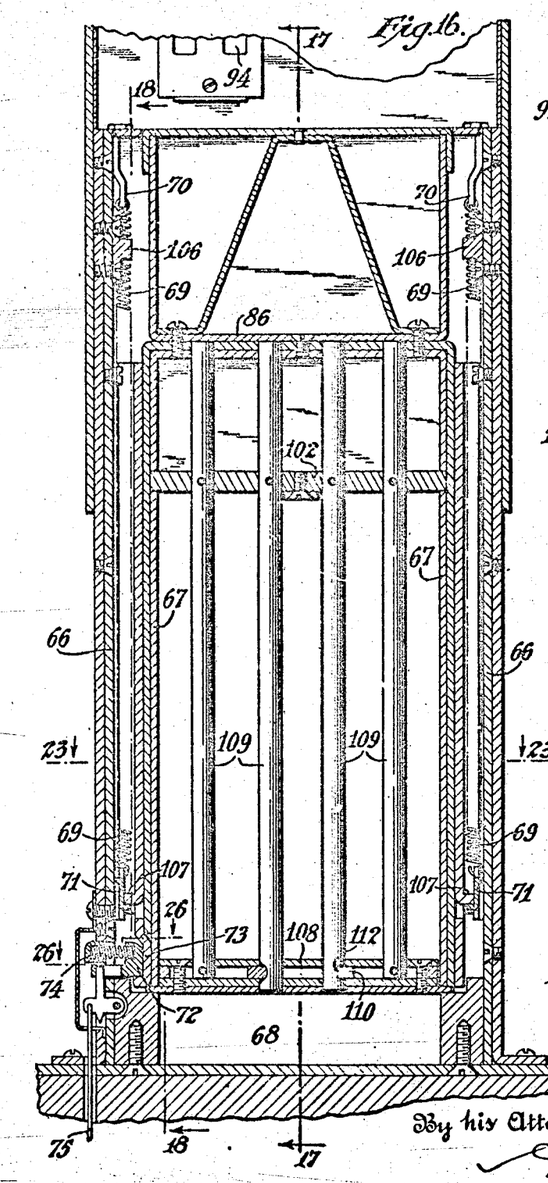
Fig. 16 is a vertical sectional view substantially on the plane of line 16—16 of Fig. 17.
Figure 17:
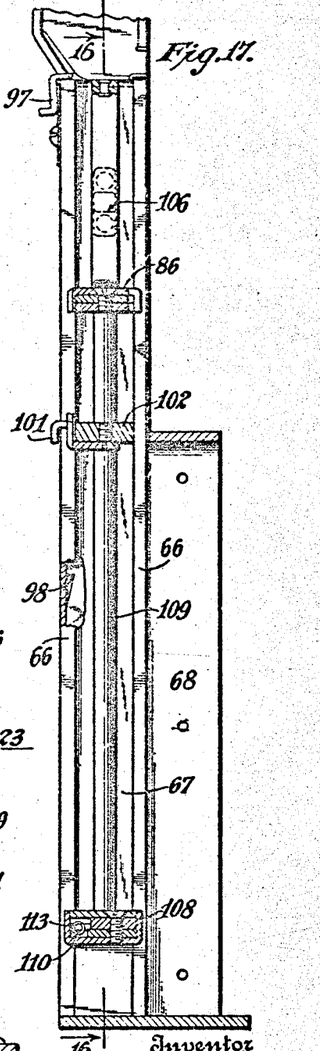
Fig. 17 is a vertical sectional view substantially on the plane of line 17—17 of Fig. 16.
Figures 18, 19, 20, 21:
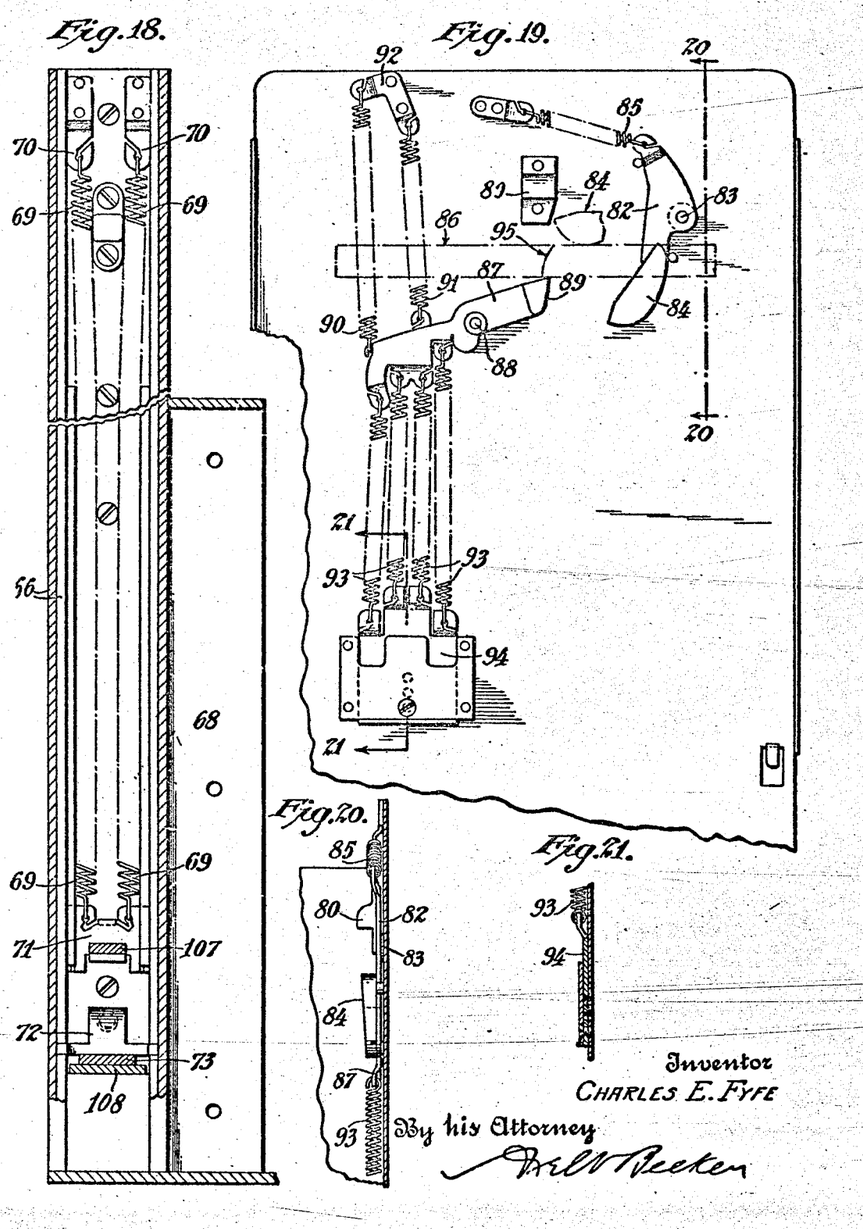
Fig. 18 is a vertical sectional view substantially on the plane of line 18—18 of Fig. 16.
Fig. 19 is a view in elevation, partly broken away, of the buffer means to retard the advance and rebound of the gate.
Fig. 20 is a sectional detail view substantially on the plane of line 20—20 of Fig. 19.
Fig. 21 is a detail sectional view substantially on the plane of line 21—21 of Fig. 19.
Figure 22:
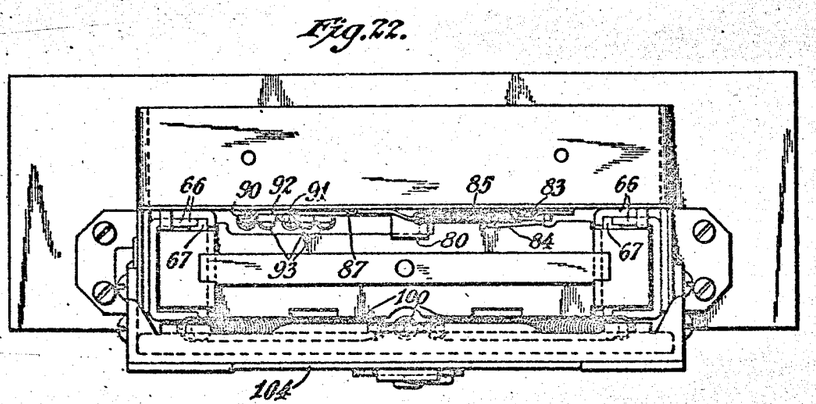
Fig. 22 is a top plan view of the teller's window.
Figure 23:
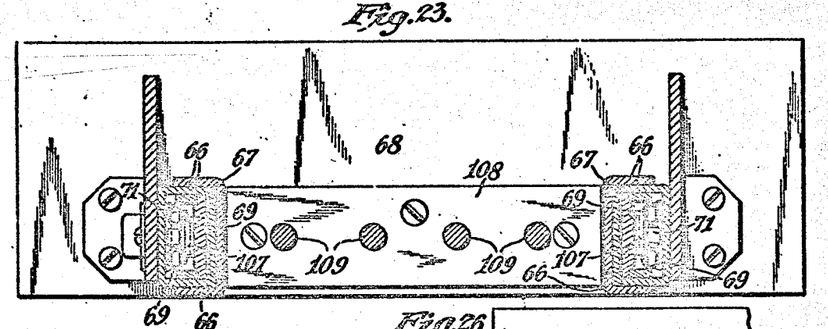
Fig. 23 is a horizontal sectional view substantially on the plane of line 23—23 of Fig. 16.
Figures 24, 26:
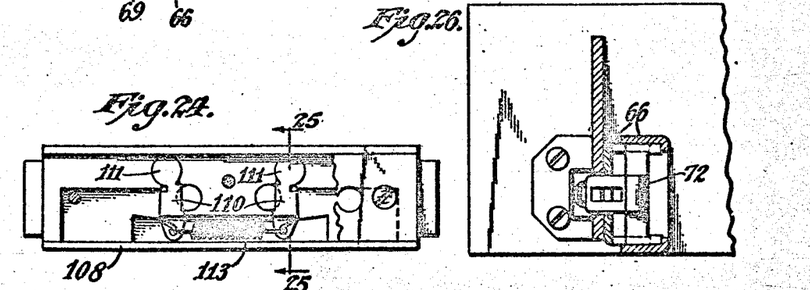
Fig. 24 is a detached plan view of the lower sill of the teller's window.
Fig. 26 is a horizontal sectional detail view substantially on the plane of line 26—26 of Fig. 16.
Figure 25:
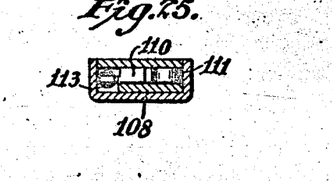
Fig. 25 is a sectional view substantially on the plane of line 25—25 of Fig. 24.
Figures 27, 28, 29, 30:
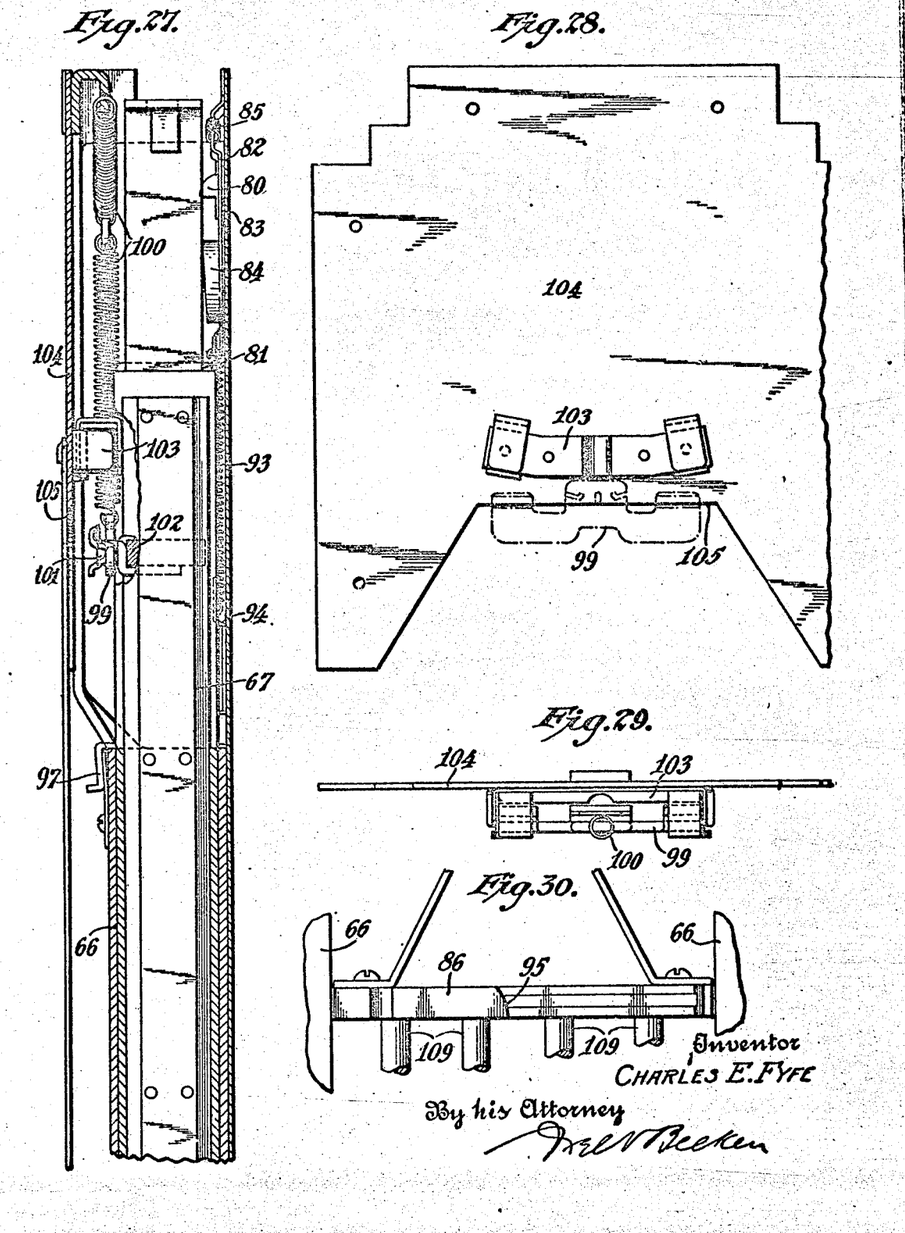
Fig. 27 is an enlarged detail vertical sectional view substantially on the plane of line 27—27 of Fig. 14.
Fig. 28 is an inside view in elevation of a cover plate associated with the teller's window and with a lifting member indicated in dotted lines.
Fig. 29 is a top plan view of Fig. 28.
Fig. 30 is a detail view in elevation of one of the cross bars of the teller's window.

Associated with the previously described protective means, and also capable of use independently thereof, is a special construction of teller's window shown in Figs. 1 and 14 to 30 inclusive. 66 indicate suitable upright guides in which are mounted slides 67 of the teller's window 68. 69 indicate springs, two on each side of the window, that are anchored at 70 in the framework and which are attached at 71 to the slides of the window. It will be seen that said springs normally tend to urge the window into its upper position; and, to normally prevent said springs from so doing, a releasable latch 72 is provided and which engages at 73 with the window. A spring 74 moves the latch into latching position and any suitable means such as connection 75 can be used to retract the latch, and when said latch is retracted the window will rise. 80 (Figs. 19 and 27) indicates a stop on the framework to limit the upward movement of the window by engaging with a member as 81 on the window; but to prevent undue impact of the window sash against said stop, suitable cushioning means are provided. These cushioning means can most readily be understood by considering Figs. 19 and 30. Mounted on a plate of the framework is a lever 82, pivoted at 83, and provided with an abutment 84. 85 is a spring that normally tends to hold the lever in the position shown in Fig. 19, and it will be understood that as the window rises, a member such as 86 will strike abutment 84 and that the blow will be cushioned by spring 85. It is to be noted that Fig. 30 is a view of the sash looking in a direction from the parts shown in Fig. 19. In addition to the foregoing, cushioning means that not only retard the upward stroke of the window sash but also cushion its rebound are provided. As shown, 87 is a lever pivotally supported at 88 and having a cam portion 89. This lever is sustained in an intermediate position by two sets of springs, one an upper one consisting of springs 90 and 91 anchored on bracket 92, and the other a lower one consisting of springs 93 anchored on adjustable plate 94. Member 86 (Fig. 30) is provided with a cam face 95 and as the window rises said face 95 will encounter cam portion 89, at about the same time that 86 encounters 84, and this will raise lever 87 so as to admit of 95 rising past 89, which latter will snap back beneath 95 and thus afford a cushion on the rebound of the window. It will be apparent that if sufficient downward pressure is exerted on the window sash, lever 87 will swing sufficiently far in a downward direction to allow 95 to pass below 89 and the window can then be lowered. Although lever 87 is sufficient to sustain the window in its upper position, it is preferred to have positive latching means such as dog 97 (Figs. 14 and 17) that engages notch 98 in the window sash. By retracting said latch and putting sufficient downward pressure upon the sash, the window can be returned to the lower position and will be held there by latch 72. In view of the fact that the window is to be associated with the previously described protective means, it is desired to have it rise very quickly so as not to obstruct the action of the attendant behind the shield in pointing a gun. For this reason, additional means to urge the window into its upper position are provided. As here shown, (Figs. 14 and 27) a lifting member 99, carried on the framework by three springs 100, engages projections 101 on cross bar 102 of the window, this lifting member therefore assisting springs 69 to lift the window. As an additional refinement, a release device 103 (Figs. 27 and 28) may be placed on the inside of front cover plate 104 to engage member 99 after the window has risen a certain distance, and to disengage said member 99 from projections 101 to thereby lessen the lifting force during the last part of the rising movement of the window. So likewise, the attendant may, in order to lessen the force required to lower the window, release said member 99 from engagement with 103 so that projections 101 will not reengage member 99 as the window descends, and may place said member 99 in engagement with surface 105 of plate 104 (Fig. 1) on the framework until the window has been lowered. The attendant may then reengage 99 with projections 101. An additional stop 106 (Figs. 16 and 17), one on each side of the framework, to engage a part 107 on the window may be used so that the latter will not fly out of the guides when disassembling the parts. Should it be attempted, as by a stranger, to prevent the window or gate from rising as by placing a gun on lower sill 108 (Figs. 16, 23, 24 and 25), said gate or window will nevertheless rise because said lower sill will then release itself from bars 109 when latch 73 is released and springs 69 are free to act. To accomplish this, said lower sill is provided with a number of spring-pressed dogs 110 that are pivotally supported at 111 and which engage notches 112 in two of the bars 109. Spring 113 is so light that the upward movement of the gate will cause said spring to yield if any downward pressure is exerted against sill 108.

It will be apparent that by movement of connection 75 the gate or window may be released and will rise, for instance, when it is desired to take in a package through the opening of the window. However, there may be an interconnection between connection 75 and connection 11, as shown at 114 (Fig. 14) so that when the protective shield is brought into action the gate will likewise fly up. Said connections 75 and 11 may be operated either by pulls or buttons or by foot pedals as may be desired.

The construction of the teller's gate, shown more particularly in Figs. 14 to 30 inclusive, is not claimed herein but forms the subject matter of application Ser. No. 547,835, filed June 30, 1931.

I claim:

1. Protective means including: a main shield pivotally supported and normally occupying a recumbent position, a top wing pivotally connected to the main shield and folded beneath the latter when said main shield occupies the recumbent position, means to urge said shield and wing into an upright and extended protective position, and a releasable latch to normally retain said shield and wing in the folded and recumbent position and which when released admits of said shield and wing moving into the upright and extended protective position.

2. Protective means including: a main shield pivotally supported and normally occupying a recumbent position, side wings pivotally connected to the main shield and folded beneath the latter when said main shield occupies the recumbent position, means to urge said shield and wings into an upright and extended protective position, and a releasable latch to normally retain said shield and wings in the folded and recumbent position and which when released admits of said shield and wings moving into the upright and extended protective position.

3. Protective means including: a main shield pivotally supported and normally occupying a recumbent position, side and top wings pivotally connected to the main shield and folded beneath the latter when said main shield occupies the recumbent position, means to urge said shield and wings into an upright and extended protective position, and a releasable latch to normally retain said shield and wings in the folded and recumbent position and which when released admits of said shield and wings moving into the upright and extended protective position.

4. Protective means including: a main shield pivotally supported and normally occupying a recumbent position, side wings pivotally connected to the main shield and folded beneath the latter when said main shield occupies the recumbent position, means to urge said shield and wings into an upright and extended protective position, a releasable latch to normally retain said shield and wings in the folded and recumbent position and which when released admits of said shield and wings moving into the upright and extended protective position, and top wings pivotally connected to the side wings and foldable beneath the latter to be released into protective position upon the movement of said side wings into protective position.

5. Protective means including: a main shield pivotally supported and normally occupying a recumbent position, side and top wings pivotally connected to the main shield and folded beneath the latter when said main shield occupies the recumbent position, means to urge said shield and wings into an upright and extended protective position, a releasable latch to normally retain said shield and wings in the folded and recumbent position and which when released admits of said shield and wings moving into the upright and extended protective position, and top wings pivotally connected to the side wings and foldable beneath the latter to be released into protective position upon the movement of said side wings into protective position.

6. A teller's station or the like including: a supporting surface, protective means consisting of an assemblage of collapsible shields normally folded into a recumbent position in said surface, a releasable latch to normally retain said assemblage in folded position and which when released admits of said shields moving into protective position, a teller's window adjacent said support and in front of the assemblage and means to move said window into non-obstructive position when the assemblage moves into protective position.

Signed at Cedarhurst, in the county of Nassau, and State of New York, this 19th day of June, 1929.

CHARLES E. FYFE.